(12) United States Patent
Goker et al.

(10) Patent No.: US 11,363,100 B2
(45) Date of Patent: Jun. 14, 2022

(54) NETWORK ATTACHED DEVICE FOR ACCESSING REMOVABLE STORAGE MEDIA

(71) Applicant: Quantum Corporation, San Jose, CA (US)

(72) Inventors: Turguy Goker, Vista, CA (US); Jaewook Lee, Irvine, CA (US); Hoa Le, Orange, CA (US); Suayb S. Arslan, Istanbul (TR); James Peng, Santa Maria, CA (US)

(73) Assignee: QUANTUM CORPORATION, San Jose, CA (US)

( * ) Notice: Subject to any disclaimer, the term of this patent is extended or adjusted under 35 U.S.C. 154(b) by 961 days.

(21) Appl. No.: 15/487,776

(22) Filed: Apr. 14, 2017

(65) Prior Publication Data

US 2018/0302473 A1    Oct. 18, 2018

(51) Int. Cl.
*H04L 67/1097* (2022.01)
*G06F 3/06* (2006.01)
*G06F 16/182* (2019.01)
*G06F 16/185* (2019.01)

(52) U.S. Cl.
CPC .......... *H04L 67/1097* (2013.01); *G06F 3/067* (2013.01); *G06F 3/0607* (2013.01); *G06F 3/0661* (2013.01); *G06F 3/0682* (2013.01); *G06F 16/1827* (2019.01); *G06F 3/0646* (2013.01); *G06F 16/185* (2019.01)

(58) Field of Classification Search
CPC ... H04L 67/1097; G06F 3/067; G06F 17/302; G06F 17/30221; G06F 3/0646
See application file for complete search history.

(56) References Cited

U.S. PATENT DOCUMENTS

| | | | | |
|---|---|---|---|---|
| 6,014,675 A | * | 1/2000 | Brewer | G06F 3/0607 |
| 6,052,341 A | * | 4/2000 | Bingham | G06F 3/061 |
| | | | | 700/214 |
| 6,061,309 A | * | 5/2000 | Gallo | G11B 17/22 |
| | | | | 714/13 |
| 6,105,037 A | * | 8/2000 | Kishi | G06F 3/0607 |
| 6,154,850 A | * | 11/2000 | Idleman | G06F 11/201 |
| | | | | 714/5.11 |
| 6,199,122 B1 | * | 3/2001 | Kobayashi | G06F 3/0607 |
| | | | | 709/214 |
| 6,226,711 B1 | * | 5/2001 | Fisher | G06F 3/0619 |
| | | | | 711/111 |
| 6,269,423 B1 | * | 7/2001 | Kishi | G06F 12/121 |
| | | | | 707/999.202 |
| 6,389,503 B1 | * | 5/2002 | Georgis | G06F 3/0607 |
| | | | | 369/32.01 |

(Continued)

*Primary Examiner* — Alina A Boutah
(74) *Attorney, Agent, or Firm* — Roeder & Broder LLP; James P. Broder

(57) ABSTRACT

Embodiments disclosed herein provide systems, methods, and computer readable media to access data on removable storage media via a network attached access device. In a particular embodiment, a method provides receiving one or more user provided, in the removable storage media access device, receiving data over a packet communication network for storage on a removable storage medium. After receiving the data, the method provides preparing the data for storage on the removable storage medium. After preparing the data, the method provides writing the data to the removable storage medium.

20 Claims, 6 Drawing Sheets

(56) References Cited

U.S. PATENT DOCUMENTS

| | | | | |
|---|---|---|---|---|
| 6,477,628 B1* | 11/2002 | Bish | G06F 3/0613 | 711/154 |
| 6,718,427 B1* | 4/2004 | Carlson | G06F 3/0617 | 360/48 |
| 6,816,941 B1* | 11/2004 | Carlson | G06F 3/0607 | 711/111 |
| 7,092,975 B2* | 8/2006 | Bradley | G06F 17/30315 | |
| 7,147,147 B1* | 12/2006 | Enright | G06Q 20/042 | 235/379 |
| 7,499,958 B1* | 3/2009 | Ionescu | G06F 17/30321 | |
| 8,326,799 B2* | 12/2012 | Feldman | G06F 16/10 | 707/610 |
| 8,495,387 B2* | 7/2013 | Starr | G06F 21/602 | 713/189 |
| 8,549,297 B1* | 10/2013 | Topham | G06F 21/80 | 380/278 |
| 9,519,696 B1* | 12/2016 | Roth | G06F 17/30569 | |
| 10,073,730 B1* | 9/2018 | Donlan | H03M 13/00 | |
| 2001/0002477 A1* | 5/2001 | Cadden | H04L 67/42 | 711/111 |
| 2001/0049779 A1* | 12/2001 | Shimada | G06F 3/0601 | 711/205 |
| 2003/0066949 A1* | 4/2003 | Mueller | G01B 11/00 | 250/208.1 |
| 2003/0236988 A1* | 12/2003 | Snead | H04L 63/101 | 713/193 |
| 2004/0019795 A1* | 1/2004 | Okaue | G06F 21/10 | 713/189 |
| 2004/0179284 A1* | 9/2004 | Martin | G11B 20/00007 | 360/8 |
| 2004/0221114 A1* | 11/2004 | Devassy | G06F 3/0613 | 711/151 |
| 2005/0080992 A1* | 4/2005 | Massey | G06F 3/0605 | 711/114 |
| 2005/0237410 A1* | 10/2005 | Shiohara | H04N 5/23293 | 348/333.01 |
| 2006/0218113 A1* | 9/2006 | Kishi | G06F 21/6218 | |
| 2006/0218413 A1* | 9/2006 | Romines | G06F 11/1076 | 713/193 |
| 2007/0136517 A1* | 6/2007 | Edling | G11B 20/12 | 711/111 |
| 2007/0201164 A1* | 8/2007 | Bauck | G11B 17/225 | 360/98.04 |
| 2008/0040723 A1* | 2/2008 | Haustein | G06F 3/0605 | 718/104 |
| 2011/0087631 A1* | 4/2011 | Feldman | G06F 16/10 | 707/610 |
| 2013/0111218 A1* | 5/2013 | Starr | G06F 21/602 | 713/189 |
| 2016/0349993 A1* | 12/2016 | Udupi | G06F 3/061 | |
| 2018/0357017 A1* | 12/2018 | Karr | G06F 3/0685 | |
| 2018/0357018 A1* | 12/2018 | Karr | G06F 3/0685 | |
| 2018/0357019 A1* | 12/2018 | Karr | G06F 3/0685 | |
| 2018/0373587 A1* | 12/2018 | Donlan | G06F 11/1004 | |

* cited by examiner

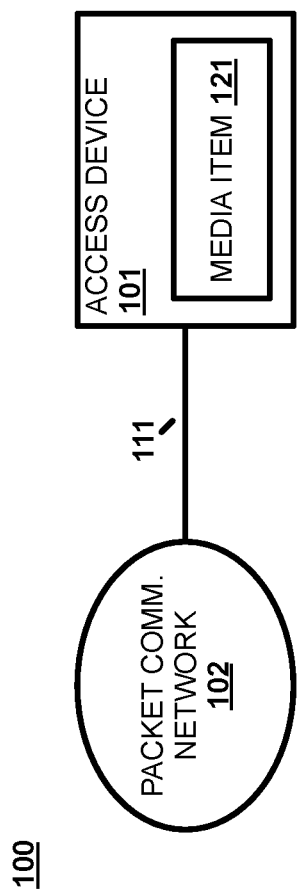
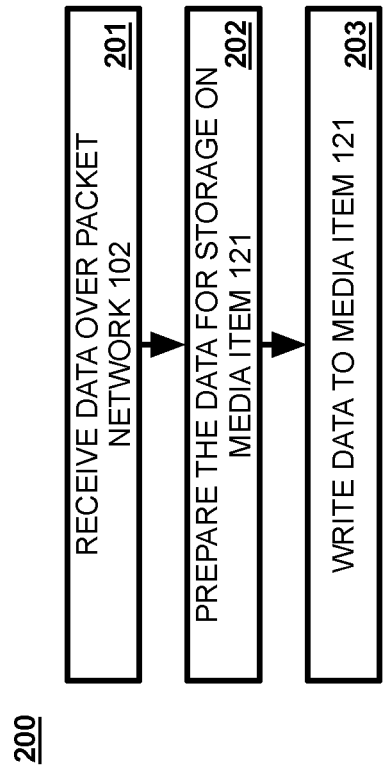

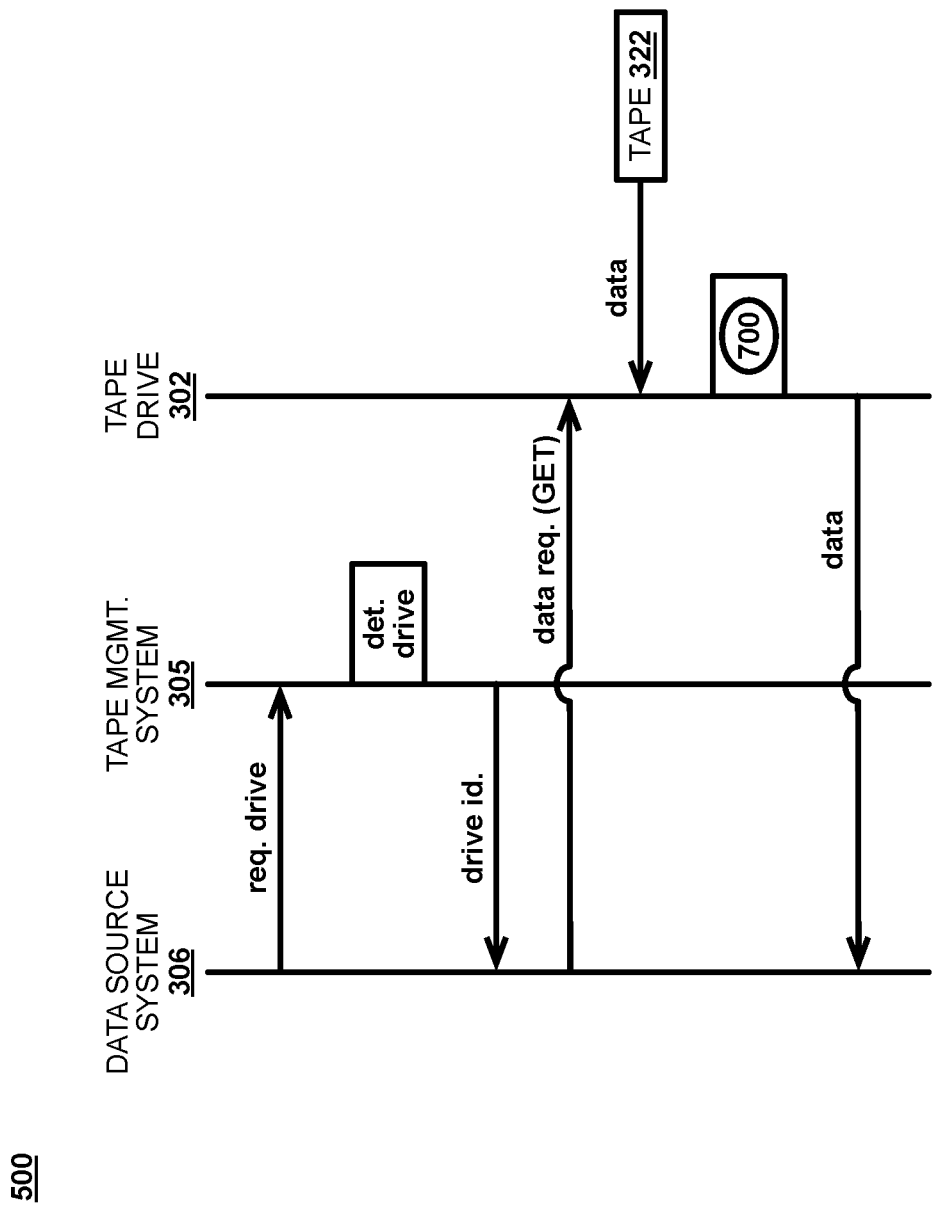

NETWORK ATTACHED DEVICE FOR ACCESSING REMOVABLE STORAGE MEDIA

TECHNICAL FIELD

Aspects of the disclosure are related to the storage of data on removable storage media and, in particular, to devices that access the removable storage media.

TECHNICAL BACKGROUND

Storing data on removable storage media, such as magnetic tape cartridges or optical discs, requires access devices for either writing data to or reading data from individual media items. For example, a magnetic tape drive stores data to and reads data from magnetic tape cartridges. The fact that the hardware necessary to access removable storage media is in the access devices allows removable storage media to be relatively inexpensive for the amount of data that can be stored thereon. Even a single access device can be used to access data on any number of removable storage media items by simply placing an item to be accessed in the access device. Additional access devices may be desired to access multiple items of removable storage media concurrently, although they are not required.

As noted above, removable storage media is a relatively inexpensive way to store data, especially in cases where data access speed is less important (e.g., long term data backup). However, current access devices require one or more control computing systems, such as a server, to provide the access devices, over a legacy device interface (e.g., Small Computer System Interface (SCSI)), with data to be stored, or to request data already stored, on removable storage media. Such computing systems add a level of cost and complexity to the process of accessing data on removable storage media. Likewise, should another access device be desired, the control computing system must be properly configured to use that new device.

OVERVIEW

Embodiments disclosed herein provide systems, methods, and computer readable media to access data on removable storage media via a network attached access device. In a particular embodiment, a method provides receiving one or more user provided, in the removable storage media access device, receiving data over a packet communication network for storage on a removable storage medium. After receiving the data, the method provides preparing the data for storage on the removable storage medium. After preparing the data, the method provides writing the data to the removable storage medium.

In some embodiments, upon receiving the data, the method provides caching the data until processing resources are available to prepare the data for storage.

In some embodiments, the removable storage medium comprises a key/value store format. In those embodiments receiving the data may comprise receiving an application programming interface (API) command to store the data in the key/value format.

In some embodiments, the removable storage media access device comprises one of two or more removable storage media access devices. In those embodiments, the two or more removable storage media access devices may comprise object storage device (OSD) storage nodes, such as OSD storage nodes in a Ceph architecture.

In some embodiments, preparing the data comprises one or more of data processing functions that include applying a cyclic redundancy check (CRC) error correcting code to the data, compressing the data, encrypting the data, and erasure coding the data.

In some embodiments, receiving the data comprises receiving the data over an Ethernet link.

In some embodiments, the removable storage media access device comprises a magnetic tape drive and the removable storage medium comprises a magnetic tape cartridge.

In another embodiment, a removable storage media access device is provided including a packet network interface to receive data over a packet communication network for storage on a removable storage medium. The removable storage media access device further includes processing circuitry to, after the data is received, prepare the data for storage on the removable storage medium. Also, the removable storage media access device includes a removable storage media access interface to, after the data is prepared, write the data to the removable storage medium.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

FIG. 1 illustrates a removable storage media environment for accessing data on removable storage media via a network attached access device.

FIG. 2 illustrates a method of operating the removable storage media environment to access data on removable storage media via a network attached access device.

FIG. 5 illustrates another example scenario for the other removable storage media environment to access data on removable storage media via a network attached access device.

DETAILED DESCRIPTION

Figure 3:
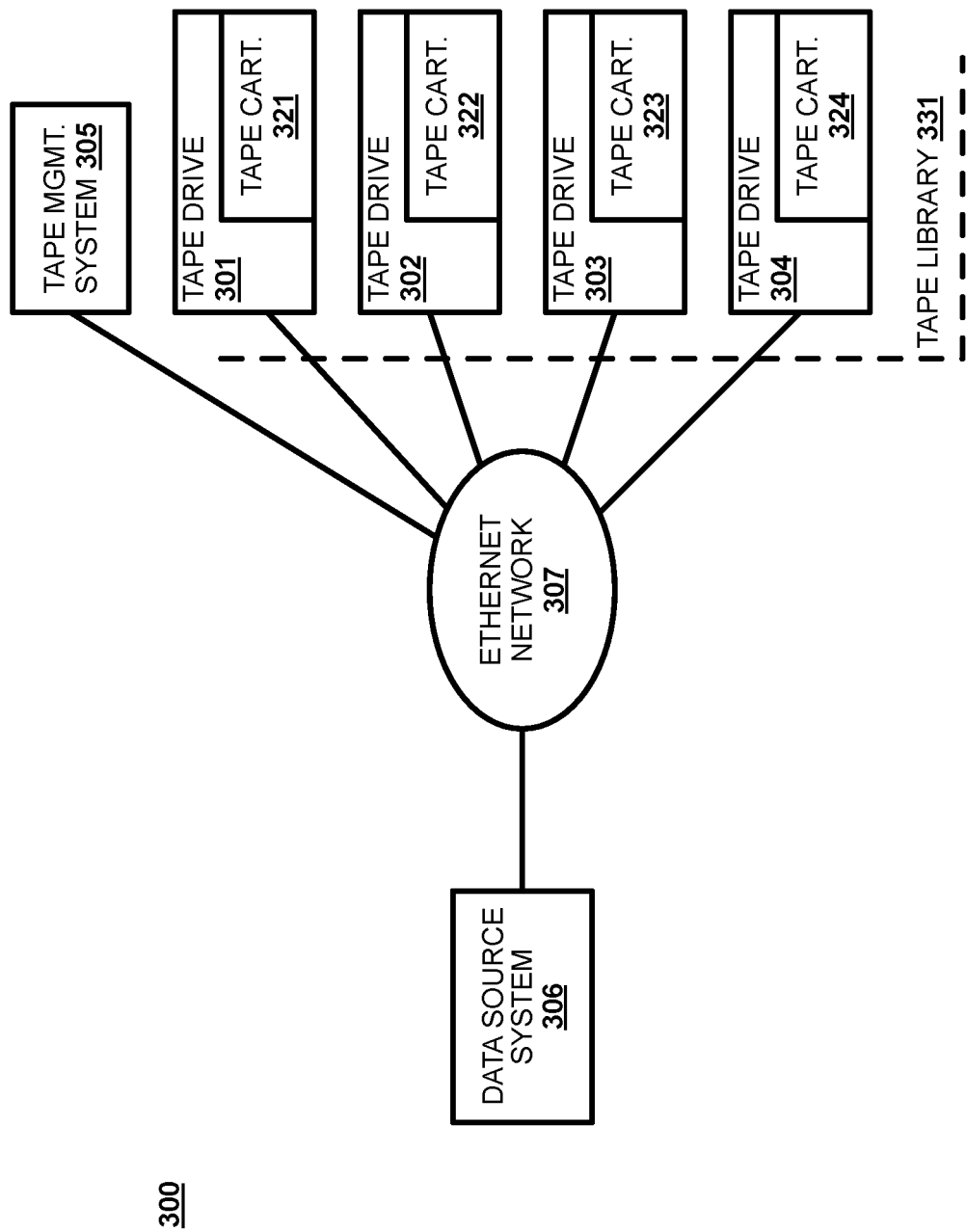
FIG. 3 illustrates another removable storage media environment for accessing data on removable storage media via a network attached access device.

The removable storage media access devices disclosed herein are attached directly to packet networks, such as a local area network (LAN) or wide area network (WAN) and are capable of storing data received over those packet networks to items of removable storage media. Traditional access devices require a control computing system as an intermediate system between a packet network and an access device. As such, data that is to be stored on one or more items of removable storage media must first be transferred to the intermediate system. The intermediate system processes the received data in preparation of the data being stored on removable storage media before transferring the data to the access device over an interface, such as SCSI, Serial Advanced Technology Attachment (SATA), and the like, rather than via the packet network.

In addition to being attached to a packet network, the access devices herein include circuitry to perform processing functions that would otherwise have been performed by the intermediate system discussed above. For example, a server managing one or more access devices may process data for protection, compression, encryption, erasure coding, formatting, or some other purpose—including combinations thereof, before sending the data to an access device for writing to removable storage media. Most, if not all, of these processing functions can be implemented as dedicated hardware circuitry (e.g., using an application specific integrated circuit (ASIC)) that a typical generic server will not include and will instead perform using higher cost and power conventional central processing units (CPUs), although the circuitry itself may include one or more processor cores (preferably lower power cores, such as ARM type cores). In contrast, the access devices herein may include such dedicated hardware circuitry to perform the desired data processing functions. The inclusion of the data processing functionality in the access devices themselves at least reduces/removes the need for a powerful intermediate system performing such tasks.

Moreover, multiple access devices may be used in some cases, such as in an automated (e.g., robotic) tape library. An intermediate system may also be tasked with determining where data should be stored (e.g., determine on which item(s) of removable storage media the data should be stored) and to which access device(s) the data should be sent (e.g., into which access devices the item(s) of removable storage media should be placed if not placed already). These processing functions may further be offloaded to processing circuitry in the access devices to eliminate the need for an intermediate system all together.

FIG. 1 illustrates automated removable media system 100 for accessing data via a network attached access device. Removable storage media environment 100 includes removable storage media access device 101 and packet communication network 102. Removable storage media access device 101 and packet communication network 102 communicate over communication link 111.

Packet communication network 102 may comprise any number of LANs, WANs, the Internet, or some other type of data network—including combinations thereof. Packet network may operate using Internet Protocol (IP) or may use some other network protocol. Removable storage media access device 101 accesses packet communication network 102 in the same manner as any other computing system or device would access packet communication network 102, such as through a wired (e.g., Ethernet) or wireless (e.g., WiFi) network interface at the termination of communication link 111. Accordingly, the connection with packet communication network 102 allows removable storage media access device 101 to exchange data directly with other systems and devices over packet communication network 102 rather than relying on an intermediate system of some kind and an interface with that system (e.g., a SCSI interface).

FIG. 2 illustrates method 200 of operating removable storage media environment 100 to access data via a network attached access device. Method 200 provides removable storage media access device 101 receiving data over packet communication network 102 for storage on a removable storage medium (201). The data may be received from any system capable of transferring data for storage on removable storage media. For example, a system in charge of backing up a database to removable storage media may transfer the data for that backup to removable storage media access device 101 over packet communication network 102.

After receiving the data, method 200 provides removable storage media access device 101 preparing the data for storage on the removable storage medium (202). In this example, the removable storage medium is removable storage media item 121. Removable storage media item 121 may be used to store the data for any reason. Removable storage media item 121 may have been the removable storage media item in removable storage media access device 101 at the time the data was received, may have been manually inserted into removable storage media access device 101 by a user, may have be selected by removable storage media access device 101 or some other system and automatically placed in removable storage media access device 101 (e.g., by a robotic arm), or be in removable storage media access device 101 for some other reason. It should be understood that, in some examples, the storage of the data may expand beyond removable storage media item 121. For example, removable storage media item 121 may not include enough free space for the data and another item may be placed in removable storage media access device 101 to complete the storage of the data.

Preparing the data for storage may include formatting the data, protecting the data with an error correcting code (e.g., a cyclic redundancy check (CRC) code), compressing the data, encrypting the data, erasure coding the data, or performing some other type of processing function. Any or all of the processing steps may be performed by in hardware by processing circuitry specifically designed for such processing. Such hardware typically allows the processing to be performed faster while using less power than software instructions executing on more general-purpose processing units. In some examples, the data may be stored in a cache memory of removable storage media access device 101 (e.g., a flash based memory) before processing should removable storage media access device 101 not be ready to process the data at the time of receipt or otherwise determines to delay the processing of the data. In some cases, removable storage media access device 101 may include programmable logic that may be updated, by a user or otherwise, with new algorithms to process the data. For instance, the programmable logic may be updated with a different reassure code/policy or an update of an existing code/policy. Other types of algorithms, such as CRC computation, deduplication, etc., may also be implemented by updated using the programmable logic.

After preparing the data, method 200 provides removable storage media access device 101 writing the data to removable storage media item 121 (203). As part of the processing above, removable storage media access device 101 may determine to distribute the processed data throughout removable storage media item 121 to protect against media defects, data channel failure (depending on media type), or some other way in which data can be corrupted or lost. Advantageously, the data is now stored on removable storage media item 121 after going through processing similar to what would have been performed by an intermediate system between removable storage media access device 101 and packet communication network 102. However, the additional processing capabilities and the interface to packet communication network 102 of removable storage media access device 101 remove the need for such an intermediate system in removable storage media environment 100.

In some examples, machine learning may be implemented using the electronic circuitry in removable storage media access device 101. Deep learning type algorithms develop metadata for the data to be stored in removable storage media item 121. The metadata may be used for future searches of objects, such as images or logos, or to adaptively learn about the health of removable storage media access device 101. For example, the metadata may be generated from information collected during post operations such as error rate, error events, alerts, and other performance type information, including user cartridges and special reference cartridges. These learning algorithms may be executed in the local electronics of removable storage media access device 101 or, especially for more computationally extensive algorithms, may use a portion of the local electronics in parallel with those of other access devices in parallel to gain compute power at very high speeds without the cost and power of a server computing system. In the latter examples, the multiple access devices in parallel may serve as a compute unit where computationally extensive algorithms may be executed in a parallel architecture forming multithread multi core concept similar to that which would traditionally be implemented using one or more CPUs in a server system.

In some embodiments, the internal electronics and cache memory of removable storage media access device 101 may be used to isolate data transfer mismatches that may occur between a data source and removable storage media item 121, especially in cases where magnetic tape is the type of media. These additional internal electronics may serve as local compute engines to provide the translation unit that interfaces with sources as a key value store and executes the required algorithms such that the processed data can efficiently be stored in the removable media. This also eliminates the need for external server systems.

Referring back to FIG. 1, removable storage media access device 101 comprises media interface components necessary to access data on removable storage media item 121 along with the processing circuitry and network interface discussed above. Removable storage media access device 101 may include data access head(s) (e.g., magnetic, optical, etc.), electrical connectors, optical connectors, or any other type of hardware necessary to interface with removable media—including combinations thereof. Removable storage media access device 101 may comprise a magnetic tape drive, an optical disk drive, a magnetic disk drive, flash memory reader, or some other type of removable media drive. In some examples, removable storage media access device 101 may include components necessary to access more than one type of removable media.

Removable storage media item 121 may comprise any type of removable storage media that can be accessed by removable storage media access device 101. Removable storage media item 121 may comprise magnetic tape, optical disk, magnetic disk, flash memory, or some other type of removable memory. In general, removable storage media comprises any type of computer readable medium that is designed to be readily removed and not always be coupled to a computing system capable of reading that media. For example, magnetic tape cartridges are designed for access by a computing system when inserted into a magnetic tape drive but can be removed for portability or to free up the drive for access to other magnetic tape cartridges. In some cases, media types may be considered removable depending on the type of enclosure used. For instance, a hard disk drive may be placed in an enclosure allowing for easy insertion and removal from a system rather than being more permanently installed. In no examples is removable storage medium 103 a mere propagated signal.

Communication link 111 uses metal, glass, air, space, or some other material as the transport media. Communication link 111 could use various communication protocols, such as Time Division Multiplex (TDM), Internet Protocol (IP), Ethernet, communication signaling, Code Division Multiple Access (CDMA), Evolution Data Only (EVDO), Worldwide Interoperability for Microwave Access (WIMAX), Global System for Mobile Communication (GSM), Long Term Evolution (LTE), Wireless Fidelity (WIFI), High Speed Packet Access (HSPA), or some other communication format—including combinations thereof. Communication link 111 could be direct links or may include intermediate networks, systems, or devices.

FIG. 3 illustrates removable storage media environment 300 for accessing data via a network attached access device. Removable storage media environment 300 includes magnetic tape drives 301-304, tape management system 305, data source system 306, and Ethernet-based network 307. Elements 301-306 each include Ethernet interfaces for exchanging data packets over Ethernet-based network 307. Magnetic tape drives 301-304 are included in automated tape library 331. Tape management system 305 may also be included in automated tape library 331.

In operation, automated tape library 331 stores data from systems and devices, such as data source system 306, over Ethernet-based network 307. In some cases, Ethernet-based network 307 may be connected to additional networks, such as the Internet, from which data may also be received. While magnetic tape drives 301-304 are shown with magnetic tape cartridges 321-324 therein, it should be understood that automated tape library 331 may include any number of magnetic tape cartridges that can be inserted and removed from magnetic tape drives 301-304 (e.g., by a robotic element). As such, there are times when one or more of magnetic tape drives 301-304 may be empty.

In this example, as shown in the scenarios below, tape management system 305 comprises a separate computing system that manages automated tape library 331. For example, tape management system 305 may manage to what magnetic tape cartridge data should be stored and may also manage when a magnetic tape cartridge is placed into a particular magnetic tape drive. Such management functions use far less processing resources than the data processing that is handled by the magnetic tape drives themselves, as described below. Thus, tape management system 305 need not include the processing resources necessary to perform that data processing. Moreover, in some cases, the functionality of tape management system 305 may be included in the processing circuitry of one or more of magnetic tape drives 301-304. In such cases, magnetic tape drives 301-304 may include general purpose processing circuitry (e.g., microcontroller, microprocessor, or otherwise) that executes software instructions to carryout the functions of tape management system 305. Moreover, in some examples, the direct connection to Ethernet-based network 307 by magnetic tape drives 301-304 allows magnetic tape drives 301-304 to implement a cloud-based storage system, such as a system using the OpenStack® cloud platform.

Figure 4:
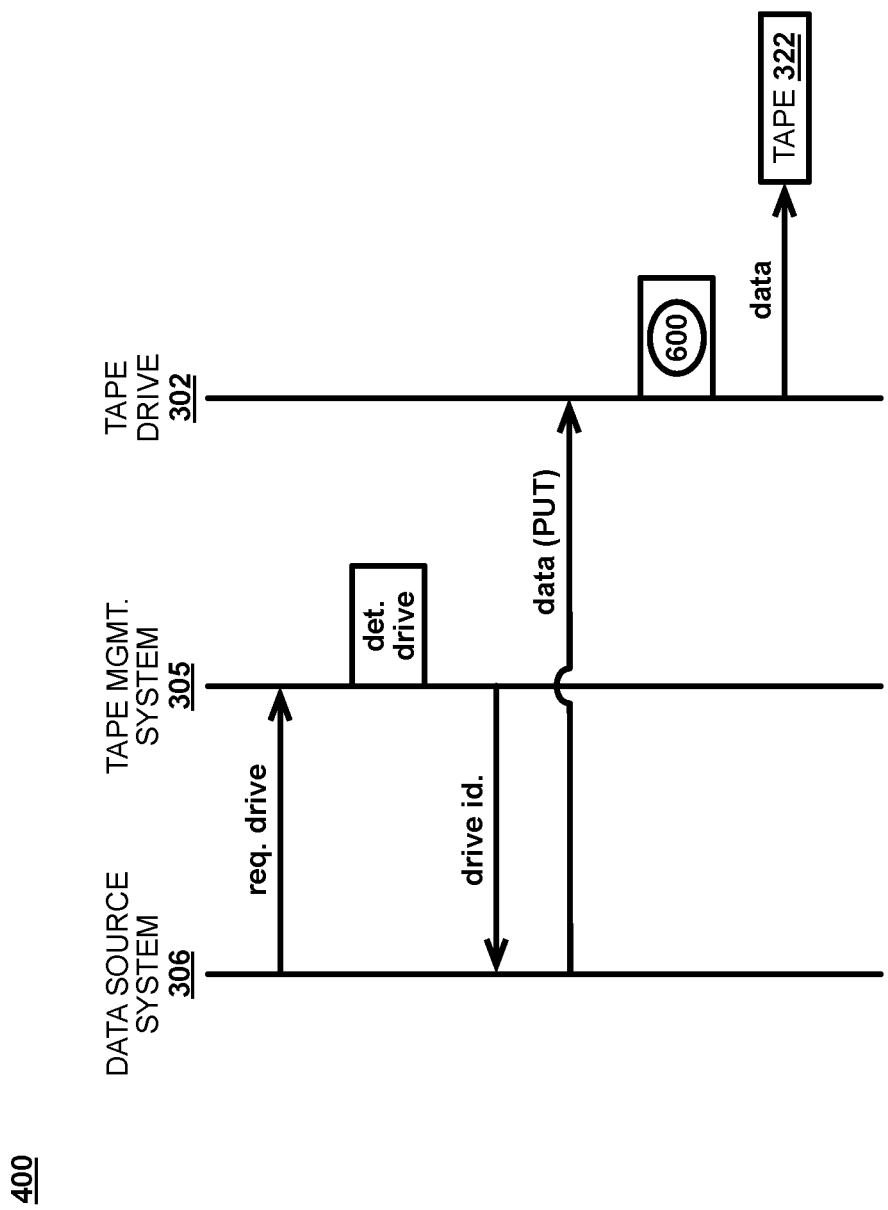
FIG. 4 illustrates an example scenario for the other removable storage media environment to access data on removable storage media via a network attached access device.

FIG. 4 illustrates an example scenario 400 for removable storage media environment 300 to access data via a network attached access device. In scenario 400, data source system 306 intends to store data on a magnetic tape cartridge of automated tape library 331. To that end, data source system 306 transfers a request message to tape management system 305 asking tape management system 305 to provide data source system 306 with a magnetic tape drive to which the data should be transferred for storage. Tape management system 305 responsively determines a magnetic tape drive to. In some examples, responsive to the request, tape management system 305 may first determine a magnetic tape cartridge onto which the data should be stored. If that magnetic tape cartridge is already located within a magnetic tape drive, then that drive would be the determined drive. Alternatively, if the identified magnetic tape cartridge is not in a magnetic tape drive, then tape management system 305 may instruct tape movement elements of automated tape library 331 to move the identified magnetic tape cartridge into a drive.

In this example, the determined drive is magnetic tape drive 302 so data source system 306's data can be stored on magnetic tape cartridge 322. Tape management system 305 transfers a response message back to data source system 306 indicating that data source system 306 should send the data to magnetic tape drive 302. The response message may indicate a network address for magnetic tape drive 302 to which packets carrying the data should be sent or may indicate magnetic tape drive 302 in some other manner. In other examples, the data from data source system 306 may not all fit onto magnetic tape cartridge 322 and tape management system 305 may therefore indicate multiple drives. Tape management system 305 may further indicate what portion of the data should be transferred to each of the drives. Of course, to make such a determination tape management system 305 would need to be provided with at least a size parameter of the data from data source system 306 either in the drive request message or at some other time. Alternatively, a different magnetic tape cartridge may be inserted into magnetic tape drive 302 to store whatever data magnetic tape cartridge 322 cannot handle.

Magnetic tape drives 301-304 in scenario 400 are implementing a key/value data store for data. Thus, like almost any key/value store, data can be accessed using application programming interface (API) commands to the key/value store, such as get, put, and delete. As such, to store the data, data source system 306 sends the data to magnetic tape drive 302 with a put command and magnetic tape drive 302 performs method 600. In some cases, the put command may be sent in place of the initial drive request message sent to tape management system 305 and tape management system 305 redirects the put message to the magnetic tape drive 302 rather than responding to data source system 306 with a message identifying magnetic tape drive 302. In one example, magnetic tape drives 301-304 may be implemented as an object storage cluster using the Ceph platform, although other types of object store platforms may be used. The data processing circuitry within each of magnetic tape drives 301-304 allows each drive to act as an object store node in the cluster without an intermediate system for data processing.

Figure 6:
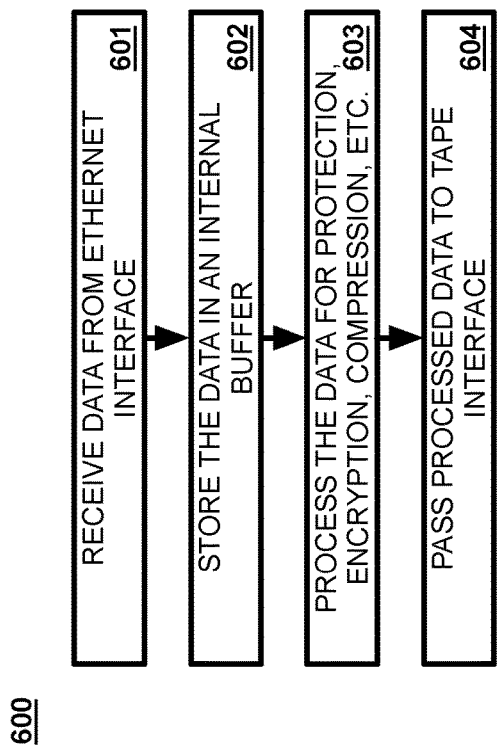
FIG. 6 illustrates a method of operating the other removable storage media environment to access data on removable storage media via a network attached access device.

FIG. 6 illustrates method 600 of operating magnetic tape drive 302 to store data to magnetic tape cartridge 322. Method 600 provides magnetic tape drive 302 receiving the data to be stored via the put command from data source system 306 (601). The received data is buffered until the data can be processed by storing the data in an internal memory cache (e.g., an internal flash-based memory) (602). The data may remain buffered until the processing circuitry is available to process the data for storage on magnetic tape cartridge 322. The processing circuitry may not be available immediately because the processing circuitry may be processing other data received by magnetic tape drive 302.

Method 600 then provides the processing circuitry of magnetic tape drive 302 processing the data for object formatting, data protection, compression, encryption, and erasure coding (603). As previously noted, the processing circuitry may preferably be specifically designed to perform the aforementioned processing at a hardware level for speed and efficiency purposes, however, it is also possible that a general purpose type processor executes instructions to process the data. The processing of the data may further indicate where on magnetic tape cartridge 322 portions of the processed data are to be stored to protect against failures (e.g., longitudinally along the tape and/or across channels of the tape). Alternatively, such data distribution may be left to processing circuitry in the tape access interface of magnetic tape drive 302.

After processing, method 600 provides passing the processed data from the processing circuitry to the magnetic tape interface of magnetic tape drive 302 (604). Magnetic tape interface includes a magnetic tape access head for manipulating data on magnetic tape cartridge 322 (e.g., writing, reading, deleting, etc.) and circuitry for controlling the functions of that magnetic tape access head. As such, referring back to scenario 400, magnetic tape drive 302 uses magnetic tape interface to write the processed data to magnetic tape cartridge 322. In some examples, the data is passed to the magnetic tape interface internally using signaling of a legacy interface, such as SCSI, to interact with the magnetic tape interface. As such, the magnetic tape interface need not be redesigned from that of a traditional magnetic tape drive that uses a legacy interface to communicate with a server system.

FIG. 5 illustrates example scenario 500 for removable storage media environment 300 to access data via a network attached access device. While scenario 400 covered how data is stored to a magnetic tape cartridge, scenario 500 covers how the data stored in scenario 400 is read from magnetic tape cartridge 322, although the same process may be used to retrieve data stored on any magnetic tape cartridge in automated tape library 331 from authorized systems other than data source system 306. In particular, data source system 306 transfers a request message to tape management system 305 that requests a drive from which data to be requested can be obtained. As such, in the request message, data source system 306 provides some identifier of the data that is being requested. In some cases, the identifier may include an identifier of the tape on which the data is stored, an identifier for the data object containing the data, or some other information that tape management system 305 can use to determine a magnetic tape cartridge on which the data is stored. Once the tape has been identified, tape management system 305 determines which of magnetic tape drives 301-304 the tape is, or will be, located. In this example, magnetic tape cartridge 322 stores the data that data source system 306 is requesting and magnetic tape cartridge 322 is in magnetic tape drive 302. In other examples, tape management system 305 may instruct tape movement elements of automated tape library 331 to move the identified magnetic tape cartridge into one of magnetic tape drives 301-304.

Upon receiving a message from tape management system 305 identifying magnetic tape drive 302, data source system 306 transfers a get request for the data from magnetic tape drive 302. In response to the get request, magnetic tape drive 302's magnetic tape interface reads the data from magnetic tape cartridge 322 so that magnetic tape drive 302 can perform method 700. In some cases, the get command may be sent in place of the initial drive request message sent to tape management system 305 and tape management system 305 redirects the get message to the magnetic tape drive 302 rather than responding to data source system 306 with a message identifying magnetic tape drive 302.

Figure 7:
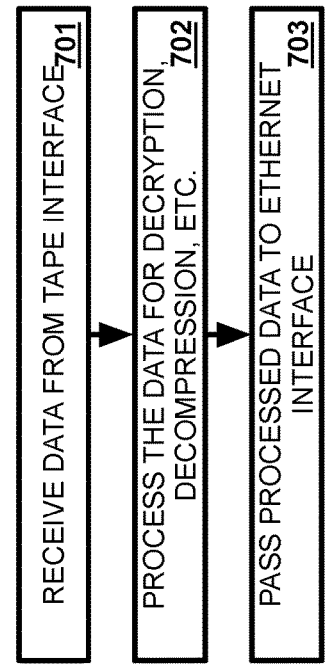
FIG. 7 illustrates another method of operating the other removable storage media environment to access data on removable storage media via a network attached access device.

FIG. 7 illustrates method 700 of operating magnetic tape drive 302 to process data read from magnetic tape drive 302. Method 700 provides that the processing circuitry of magnetic tape drive 302 receives the data read by the magnetic tape interface from magnetic tape drive 302 (701). Responsively, method 700 provides the processing circuitry reversing the processing performed during method 600. That is, the data is processed to decompress the data, decrypt the data, account for object formatting, remove data protection, etc. (702). As was the case when writing the data, the processing circuitry may preferably be specifically designed to perform the aforementioned processing at a hardware level for speed and efficiency purposes, however, it is also possible that a general purpose type processor executes instructions to process the data. Once processed, the data is passed to the communication interface of magnetic tape drive 302 so that it can be transferred to data source system 306 in response to data source system 306's request (703). As such, referring back to scenario 500, magnetic tape drive 302 transfers to data to data source system 306.

As noted above, the functions of tape management system 305 may be included in one of magnetic tape drives 301-304 or be distributed across magnetic tape drives 301-304. In a particular example, one of magnetic tape drives 301-304 is designated as a master to carry out functions similar to those described for tape management system 305, while other drives are designated slave drives that operate at the direction of the master. In these cases, exchanges similar to those described above with tape management system 305 would be handled by the master. Alternatively, in a distributed arrangement, each of magnetic tape drives 301-304 may communicate with requesting systems, such as data source system 306, and may then coordinate with one another to allow access data on the various tapes in automated tape library 331. For instance, one of magnetic tape drives 301-304 may receive a request to read data and then may redirect that request to another of magnetic tape drives 301-304 that has (or will have upon tape movement) the magnetic tape cartridge on which the requested data is stored.

Figure 8:
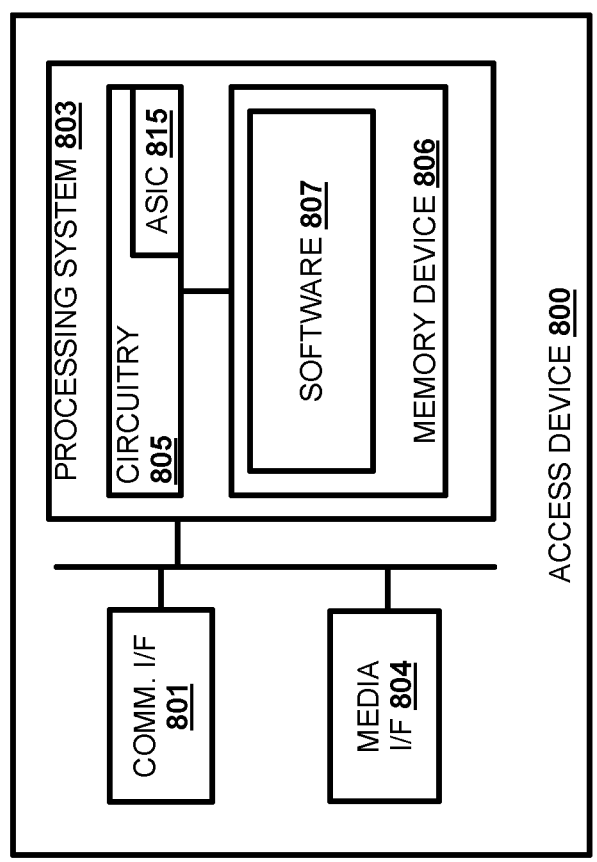
FIG. 8 illustrates a computing architecture for a network attached removable storage media access device.

FIG. 8 illustrates access device 800. Access device 800 is an example of removable storage media access device 101 and magnetic tape drives 301-304, although those elements may use alternative configurations. Access device 800 comprises communication interface 801, media interface 804, and processing system 803. Processing system 803 is linked to communication interface 801 and user interface 802. Processing system 803 includes processing circuitry 805 and memory device 806 that stores operating software 807.

Communication interface 801 comprises components that communicate over communication links, such as network cards, ports, RF transceivers, processing circuitry and software, or some other communication devices. Communication interface 801 may be configured to communicate over metallic, wireless, or optical links. Communication interface 801 may be configured to use TDM, IP, Ethernet, optical networking, wireless protocols, communication signaling, or some other communication format—including combinations thereof.

Media interface 804 includes processing and control circuitry to read, write, and otherwise manipulate data on items of removable storage media. Media interface 804 further includes one or more elements for performing such manipulations, such as a magnetic head, optical head, or some other type of media access element.

Processing circuitry 805 comprises microprocessor and other circuitry that retrieves and executes operating software 807 from memory device 806. Processing circuitry 805 further includes ASIC 815 for processing data on a hardware level, as described above, although some examples may rely, at least in part, on software 807 executing on other processing elements. Processing circuitry 805 may also include ARM processing cores, glue logic, or programmable logic to execute processing functions described herein. Memory device 806 comprises a non-transitory storage medium, such as a disk drive, flash drive (e.g. an SSD), data storage circuitry, or some other memory apparatus. Operating software 807 comprises computer programs, firmware, or some other form of machine-readable processing instructions. Operating software 807 may further include an operating system, utilities, drivers, network interfaces, applications, or some other type of software. When executed by circuitry 805, operating software 807 directs processing system 803 to operate access device 800 as described herein.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a removable storage media library, comprising a plurality of removable storage media access devices, to store data on removable storage media, the method comprising:
    in a management system of the removable storage media library:
        receiving a request over a packet communication network from a data source to store data in the removable storage media library;
        selecting a removable storage media access device from the plurality of removable storage media access devices to store the data; and
        indicating the removable storage media access device to the data source over the packet communication network;
    in the removable storage media access device:
        receiving the data from the data source over the packet communication network for storage on the removable storage medium;
        after receiving the data, preparing the data for storage on the removable storage medium; and
        after preparing the data, writing the data to the removable storage medium.

2. The method of claim 1, further comprising:
    upon receiving the data, caching the data until processing resources are available to prepare the data for storage.

3. The method of claim 1, wherein the removable storage medium comprises a key/value store format.

4. The method of claim 3, wherein receiving the data comprises:
    receiving an application programming interface (API) command to store the data in the key/value format.

5. The method of claim 1, wherein the management system is distributed across one or more of the plurality of removable storage media access devices.

6. The method of claim 1, wherein the plurality of removable storage media access devices comprise object storage device (OSD) storage nodes.

7. The method of claim 6, wherein the OSD nodes comprise a Ceph architecture.

8. The method of claim 1, wherein preparing the data comprises one or more of data processing functions that include applying a cyclic redundancy check (CRC) error correcting code to the data, compressing the data, encrypting the data, and erasure coding the data.

9. The method of claim 1, wherein receiving the data comprises receiving the data over an Ethernet link.

10. The method of claim 1, wherein the removable storage media access device comprises a magnetic tape drive and the removable storage medium comprises a magnetic tape cartridge and the magnetic tape drive is selected based on the magnetic tape drive having the magnetic tape cartridge therein or the management system being able to direct transfer of the magnetic tape cartridge into the removable storage media access device.

11. A removable storage media library, comprising a plurality of removable storage media access devices, to store data on removable storage media, the removable storage media library comprising:
a management system comprising:
a first packet network interface to receive a request over a packet communication network from a data source to store data in the removable storage media library;
first processing circuitry to select a removable storage media access device from the plurality of removable storage media access devices to store the data; and
the first network interface to indicate the removable storage media access device to the data source over the packet communication network;
the removable storage media access device comprising:
a second packet network interface to receive the data from the data source over the packet communication network for storage on the removable storage medium;
second processing circuitry to, after the data is received, prepare the data for storage on the removable storage medium; and
a removable storage media access interface to, after the data is prepared, write the data to the removable storage medium.

12. The removable storage media library of claim 11, the removable storage media access device further comprising:
a memory device to, upon the data being received, cache the data until processing resources of the second processing circuitry are available to prepare the data for storage.

13. The removable storage media library of claim 11, wherein the removable storage medium comprises a key/value store format.

14. The removable storage media library of claim 13, wherein to receive the data, the second packet network interface at least receives an application programming interface (API) command to store the data in the key/value format.

15. The removable storage media library of claim 11, wherein the management system is distributed across one or more of the plurality of removable storage media access devices.

16. The removable storage media library of claim 11, wherein the plurality of removable storage media access devices comprise object storage device (OSD) storage nodes.

17. The removable storage media library of claim 16, wherein the OSD nodes comprise a Ceph architecture.

18. The removable storage media library of claim 11, wherein to prepare the data, the processing circuitry performs one or more of data processing functions that include applying a cyclic redundancy check (CRC) error correcting code to the data, compressing the data, encrypting the data, and erasure coding the data.

19. The removable storage media library of claim 11, wherein to receive the data, the packet network interface receives the data over an Ethernet link.

20. The removable storage media library of claim 11, wherein the removable storage media access device comprises a magnetic tape drive and the removable storage medium comprises a magnetic tape cartridge and the magnetic tape drive is selected based on the magnetic tape drive having the magnetic tape cartridge therein or the management system being able to direct transfer of the magnetic tape cartridge into the removable storage media access device.

* * * * *